(12) United States Patent
Voetmann et al.

(10) Patent No.: US 11,376,934 B2
(45) Date of Patent: Jul. 5, 2022

(54) LID ARRANGEMENT FOR A CANISTER FOR A ROLLUP TRUCK BED COVER

(71) Applicant: MOUNTAIN TOP INDUSTRIES APS, Frederikssund (DK)

(72) Inventors: Thomas Rendbeck Voetmann, Jyllinge (DK); Peter Singer Hansen, Fredensborg (DK); Feigler Szabolcs, Copenhagen (DK)

(73) Assignee: MOUNTAIN TOP INDUSTRIES APS, Frederikssund (DK)

( * ) Notice: Subject to any disclaimer, the term of this patent is extended or adjusted under 35 U.S.C. 154(b) by 0 days.

(21) Appl. No.: 17/612,431

(22) PCT Filed: May 13, 2020

(86) PCT No.: PCT/EP2020/063279
§ 371 (c)(1),
(2) Date: Nov. 18, 2021

(87) PCT Pub. No.: WO2020/234073
PCT Pub. Date: Nov. 26, 2020

(65) Prior Publication Data
US 2022/0144052 A1    May 12, 2022

(30) Foreign Application Priority Data
May 20, 2019    (DK) .............................. PA 2019 70315

(51) Int. Cl.
*B60J 7/06* (2006.01)
(52) U.S. Cl.
CPC .................................... *B60J 7/067* (2013.01)

(58) Field of Classification Search
CPC ... B60J 7/067; B60J 7/068; B60J 7/085; B60J 7/041
USPC ............................................................ 296/98
See application file for complete search history.

(56) References Cited

U.S. PATENT DOCUMENTS

| | | | |
|---|---|---|---|
| 5,330,246 A * | 7/1994 | Bernardo | B60J 7/068 160/130 |
| 5,967,392 A | 10/1999 | Niemi et al. | |
| 6,568,732 B2 * | 5/2003 | De Gaillard | B60R 5/047 296/37.16 |
| 9,597,995 B1 | 3/2017 | Weltikol et al. | |
| 9,643,543 B1 | 5/2017 | Race | |
| 2011/0062744 A1 | 3/2011 | Schrader et al. | |
| 2015/0210321 A1 | 7/2015 | Jutila et al. | |
| 2016/0236550 A1 | 8/2016 | Hannan et al. | |
| 2019/0044809 A1 | 2/2019 | Willis et al. | |

FOREIGN PATENT DOCUMENTS

GB            473572 A        10/1937

* cited by examiner

*Primary Examiner* — Joseph D. Pape
(74) *Attorney, Agent, or Firm* — Fox Rothschild LLP

(57) ABSTRACT

A lid arrangement for a canister for a rollup truck bed cover comprises a lid and a canister. The canister has a main housing part and opposite housing end parts. The lid spans between said housing end parts across the main housing part, and the lid is pivotally connected to at least one of the housing end parts. The pivotal lid need not be taken fully off the canister when access is needed to the main housing part, e.g. to inspect the drain(s) or wipe up water inside the canister.

10 Claims, 9 Drawing Sheets

LID ARRANGEMENT FOR A CANISTER FOR A ROLLUP TRUCK BED COVER

CROSS REFERENCE TO RELATED APPLICATIONS

This application is a 371 filing of International Patent Application PCT/EP2020/063279 filed May 13, 2020, which claims the benefit of priority to Danish patent application no. PA 2019 70315 filed May 20, 2019, the disclosures of which are hereby incorporated by reference herein.

TECHNICAL FIELD

The present invention relates to a lid arrangement for a canister for a retractable rollup truck bed cover.

In particular the present invention relates to a lid arrangement for a canister for a rollup truck bed cover, which lid arrangement comprises a lid and a canister, wherein the canister has a main housing part and opposite housing end parts, and wherein the lid spans between said housing end parts across the main housing part.

BACKGROUND

Retractable truck bed covers are stowed away into a space-saving canister, and can be pulled out quickly and easily, manually by means of a strap or by being operated electrically.

Canisters located inside the truck bed do however take up cargo space. This fact is often perceived as a disadvantage that offsets the many advantages of both hard and soft rollup truck bed covers. Many manufacturers of truck bed covers therefore choose to dispense with a canister or arrange the canister on top of the truck bed sidewall, the latter being highly disfiguring.

Access to the canister is made via the lid. If the canister is on top of the sidewall the lid is difficult to operate due to the height of the canister. The lid is typically secured by means of screws to the side walls of the truck bed, to the housing end parts of the canister, and/or to the side rails for the truck bed cover. To get access to the canisters tools are needed. Access is for example needed in case of maintenance; such as if a drain at the bottom of the canister or at the bottom of the truck bed is blocked. Drilling holes in the truck bed walls are less preferred and preferably kept at a minimum due to ingress of water and corrosive attack.

SUMMARY OF THE INVENTION

There is a need within the art for lid arrangements for a canister for a rollup truck bed cover that are more user-friendly than the lid arrangements of the prior art, thus in a main aspect of the present invention is provided such a user-friendly lid arrangement.

In a further aspect of the present invention is provided a removable canister.

The novel and unique features whereby this need is resolved and other aspects are achieved consist in that the lid is pivotally connected to at least one of the housing end parts, wherein, in the closed position of the lid, said lid does not cover the whole width of the canister in that a rear lid edge of the lid does not extend the whole distance to a housing part rear wall of the housing end part.

Optionally the lid is pivotally connected to both housing end parts. The pivotal lid need not be taken fully off the canister when access is needed to the main housing part, e.g. to inspect the drain(s) or wipe up water inside the canister.

Thus, when using the lid arrangement of the present invention the user need not spend time to find a screw driver, unscrew screws, and later align screws and screw holes and fasten the screws again to cover the canister. Instead the user simply pivots the lid into upright position, optionally a backwards-tilted position. The lid closes by reversing the pivoting movement. Opening and closing of the canister lid takes a few minutes compared to hours for the known truck bed lids for canisters. Also, the empty canister can be lifted in and out of the cargo space without the need for special tools. A simple screw driver with hex key, unbraco, may e.g. be the sole tool to take the canister out. Although the solution to make the lid pivotally connected to the canister sounds simple, no known truck bed covers disclose a pivotal lid.

The underside of the lid may have a first pivot joint part and the housing end part may have a second pivot joint part, which second pivot joint part extends lengthwise below the first pivot joint part on an overlapping part of the lid. The pivot joint parts protrude in parallel along the lengthwise axis of the lid with the second pivot joint part protruding from a top part of the housing end part, which top part protrudes towards the front of the truck bed. So, the second pivot joint part is situated on a projection on the top part of the housing end part that faces in the direction on the driver's cab. The second pivot joint part defines a pivot axis for the first pivot joint part and thus for the lid, which pivot axis is in parallel with the lengthwise extending axis of the lid.

Within the context of the present invention the term "front" means closest to the driver's cab and the term "rear" means closest to the tailgate of the truck. The "top part" of the housing part is the part of said housing part that is farthest away from the bottom of the canister. The "underside" of the lid is the side of the lid that faces towards the canister when the lid is closed. The term "lengthwise extending" in relation to the housing end parts and the second pivot joint parts means a distance parallel to a central axis of the housing end part.

The second pivot joint part may advantageously comprise a retainer member and a holding-down member. A pivot space is delimited between the retainer member and the holding-down member to receive the first pivot joint part in a pivotal manner, and controlled in its pivoting movement by the curvature of the pivot space, and the engaging curvatures of the respective first pivot joint part and second pivot joint part, which curvatures substantially follow sectors of circles of different or same radii.

In a preferred embodiment the retainer member may comprise a first protruding retainer wall and a parallel mirror-shaped second protruding retainer wall spaced apart from the first protruding retainer wall, which retainer walls constitute a lower section in form of a spring section. The spring section has a substantial hourglass-shaped cross section where the top of the hourglass is cut off to provide a cavity for pivotally accommodating the first pivot joint part. An upper lengthwise extending cup section may serve as said cavity, which cup section constitutes the upper part of the hourglass shape in extension of the spring section. The spring section constitutes the lower part of the hourglass shape.

The cup section advantageously can face towards the holding-down member so that when the first pivot joint part is inserted into the pivot space the holding-down member can hold the first pivot joint part resiliently tensioned against the cup section, due to the lower lengthwise extending spring section being below and in extension of the upper lengthwise extending cup section and facing opposite the parallel lengthwise extending holding-down member.

The first pivot joint part may conveniently have a first pivot member that is suspended to an underside of a cover part of the lid by means of a second pivot member. The pivots members may advantageously extend the full length of the lid, or just be provided at the free ends.

In case the pivot members are provided along the full length of the lid, the lid can be cut to length from longer profiles, without subsequent provision of pivot members to the lid ends. Pivot members along the full length of the lid also provide structural and dimensional stability to the lid.

Also, the main housing part of the canister can be cut from longer lengths. Since the housing end parts of the canister can be premade standard modules, customized canisters with pivotal lids can be made quickly and easily. The lid arrangement can be provided as a modular system for assembling on location and for the aftermarket. Length of lid profiles, lids cut to standard size, length of canister main housing part profiles, canister main housing parts cut to standard size, and housing end parts can be kept in stock.

The first pivot member can simply be inserted into the pivot space and seated in the cup section of the retainer member to pivot about a head part of the holding-down member, which holding-down member can be disposed inside the first pivot member. The exterior face of the head part may be curved to allow the interior face of the cup section to pivot along the head part.

The pivot joint between the first pivot member and the second pivot joint part permits motion only in one plane. Thus, the pivoting of the lid in relation to the canister is uniaxial parallel to the lengthwise extending axis of the canister.

The head part of the holding-down member may have an upright stem that faces away from the retainer member to engage inside the first pivot member opposite the head part. The holding-down member may then serve to frictionally engage the first pivot member whereby the lid applies a pressure to the holding-down member towards the retainer member to fix the position of the lid.

To further fix the position of the first pivot member in relation to the cup section the first pivot member may have a lengthwise extending bead that fits in a bead gap between the first protruding retainer wall and the parallel mirror-shaped second protruding retainer wall when the lid is closed. When the bead reaches the bead gap during pivoting of the lid, the lid is closed and locked and the bead applies tension to the bead gap, and thus tension to the spring section of the retainer member. In the upright, open position of the lid the bead is free of the bead gap. The engagement of bead and bead gap may be tactile and/or audible so inform the user not to overturn the lid.

Preferably the first pivot member, which accommodates the holding-down member, can be a lengthwise extending hook part, such as an open channel or a bore that facilitates easy engagement of the lid and the housing end parts. The hook part of the first pivot member and the holding-down member can be snapped or clicked together by traverse movement of the lid, thus movement in the directed across the longitudinal axis of the lid, towards the canister, even after the canister is placed inside the cargo space of the truck bed.

The canister can be assembled with one housing end part at a time, in which case the lid is slid along the aligned axes of the hook part and the holding-down member of one housing end part until the first and second pivot joint end parts engage, and then the opposite housing end part is mounted to the lid and canister in the same manner as the first housing end part.

For firm engagement of the hook part and the holding-down member the hook part may have an interior width or diameter, which corresponds to or is slightly smaller than the height of the holding-down member.

To further hold the lid in closed position the lid may have first snap locking means disposed between a rear edge of the lid and a front edge of the lid, and the housing end part have second snap locking means arranged to interlock with the first snap coupling means.

Water from various sources, such as rainwater or melt water on top of the truck bed cover, and any other water, tend to gather inside the canister, e.g. when the roll-up truck bed cover is retracted the slats carry the water along. To drain such water from the canister any of the main housing part or the housing end parts may have drainage pipes. By providing the drainage pipe in one or both of the housing end part the drain function because neither need holes be drilled in the truck bed bottom nor in the canister bottom. It is less preferred that the water flows into the cargo space directly or via tubes to drain via premade drainage holes in the bottom of the truck bed because this would wet the cargo in the cargo space. More preferred is to drill holes in the frontmost wall of the truck bed through which a drain hose or funnel is secured so that water drains outside the car.

The canister parts can be polymeric parts or metal parts. The housing end parts, the lid profile and the main housing part profile can for example be molded parts of a durable weather resistant plastic material or be made of lightweight metal such as aluminum. The profiles for the lid and the main housing part can be extruded parts or lengths, such as polymer profiles or metal profiles, e.g. aluminum profiles. The main housing part can also be made of metal plate material that is cut to size and bend to appropriate shape.

The present invention also relates to a truck bed cover comprising the lid arrangement described above.

BRIEF DESCRIPTION OF THE DRAWINGS

The invention is described below with references to the drawing that shows an exemplary embodiment of a lid arrangement of the present invention.

DETAILED DESCRIPTION OF THE INVENTION

Below only the housing end part to be arranged in the right side of the truck bed, when seen in the forward driving direction, is described in detail. In should be emphasized that a similar the housing end part, but mirror-shaped, may be provided at the left side of the truck bed. The lid arrangement can also be used for canisters not having spiral guide track but instead rolls the truck bed cover onto a shaft or drum.

Figure 1:
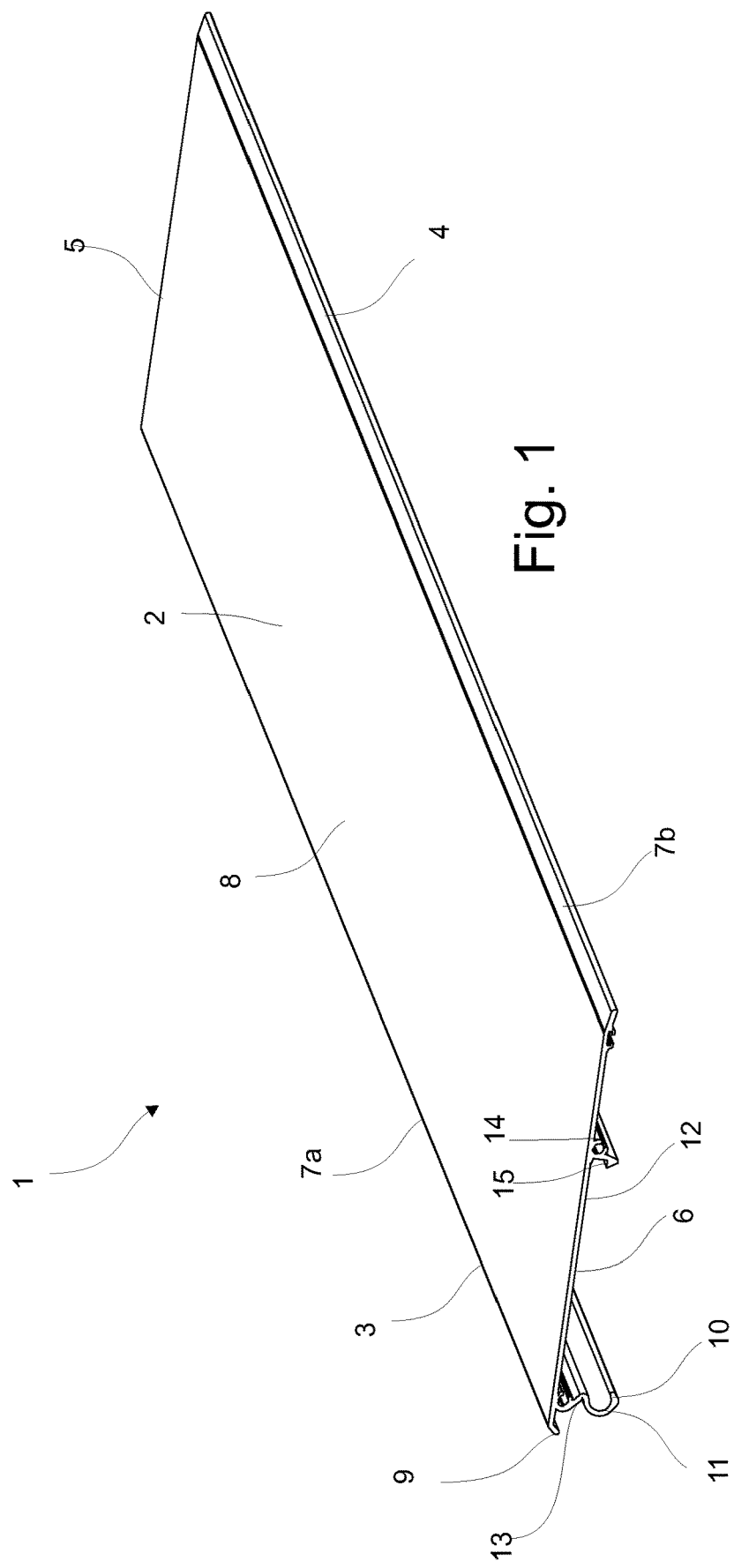
FIG. 1 is a perspective view seen from the top of a first embodiment of a lid.

FIG. 1 is a perspective view of a first embodiment of a lid 1. The lid 1 has a lid cover part 2 with a front lid edge 3, a rear lid edge 4 and opposite side edge 5,6. The front lid edge 3 has a front bending 7a, and the rear edge has a rear bending 7b, which bendings 7a,7b face away from the top side 8 of the lid 1.

The bendings 7a,7b guide water away from the lid 1, and the front bending 7a also serves as a front pivot stop 9 when the lid is in open position, as will be described later in relation to FIGS. 2 and 3.

A first pivot joint part 10 extends lengthwise the lid cover part 2 parallel to the front bending 7a. The first pivot joint part 10 consists of a first pivot member in form of a hook part 11 that is suspended to an underside 12 of the lid cover part 2 via a second pivot member 13. In an end view the first pivot member 11 and the second pivot member 13 has the outline of the mirror-shape of the number three.

Figure 2:
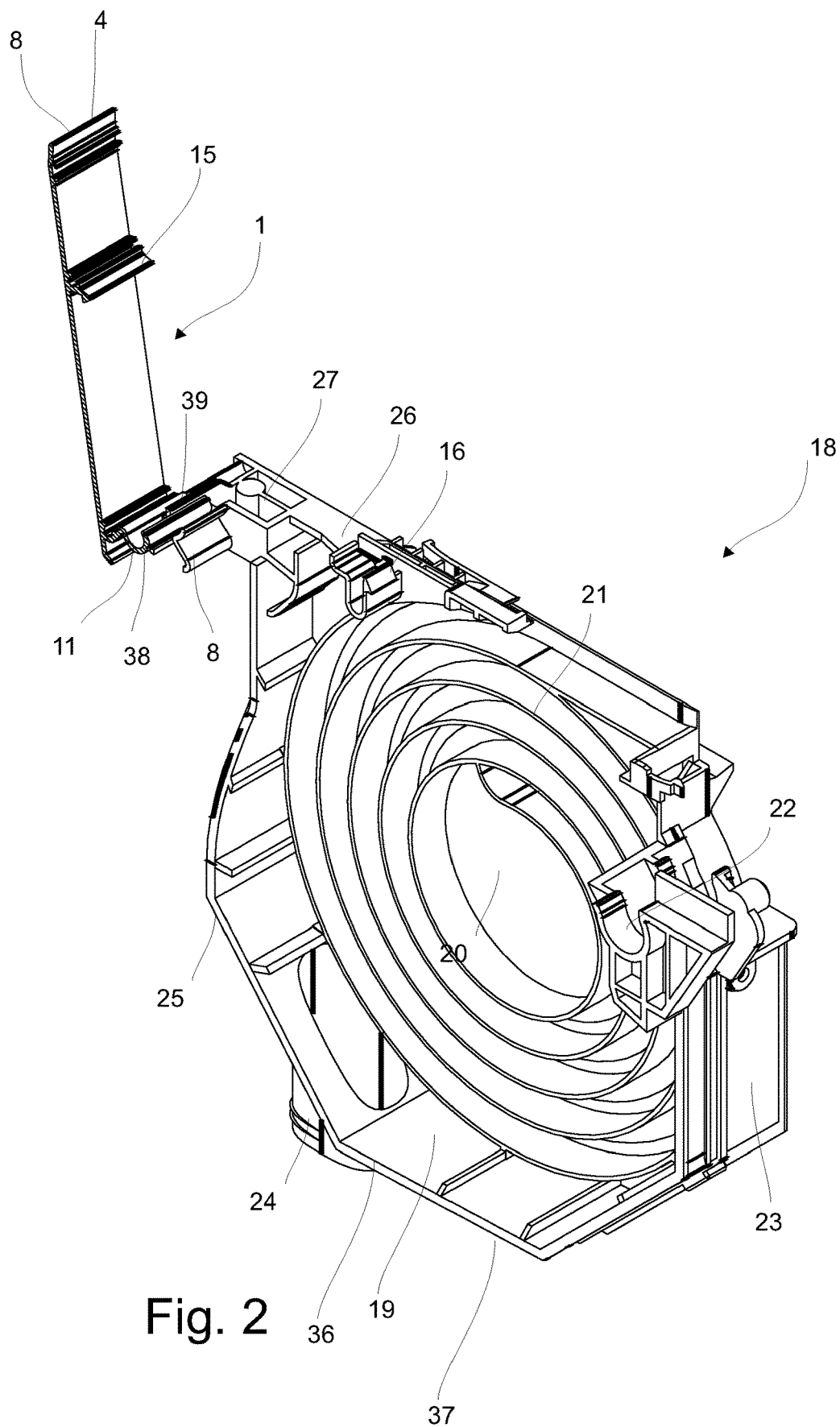
FIG. 2 is a perspective view of a housing end part assembled to a fragment of the first embodiment of a lid arranged in open position.
Figure 3:
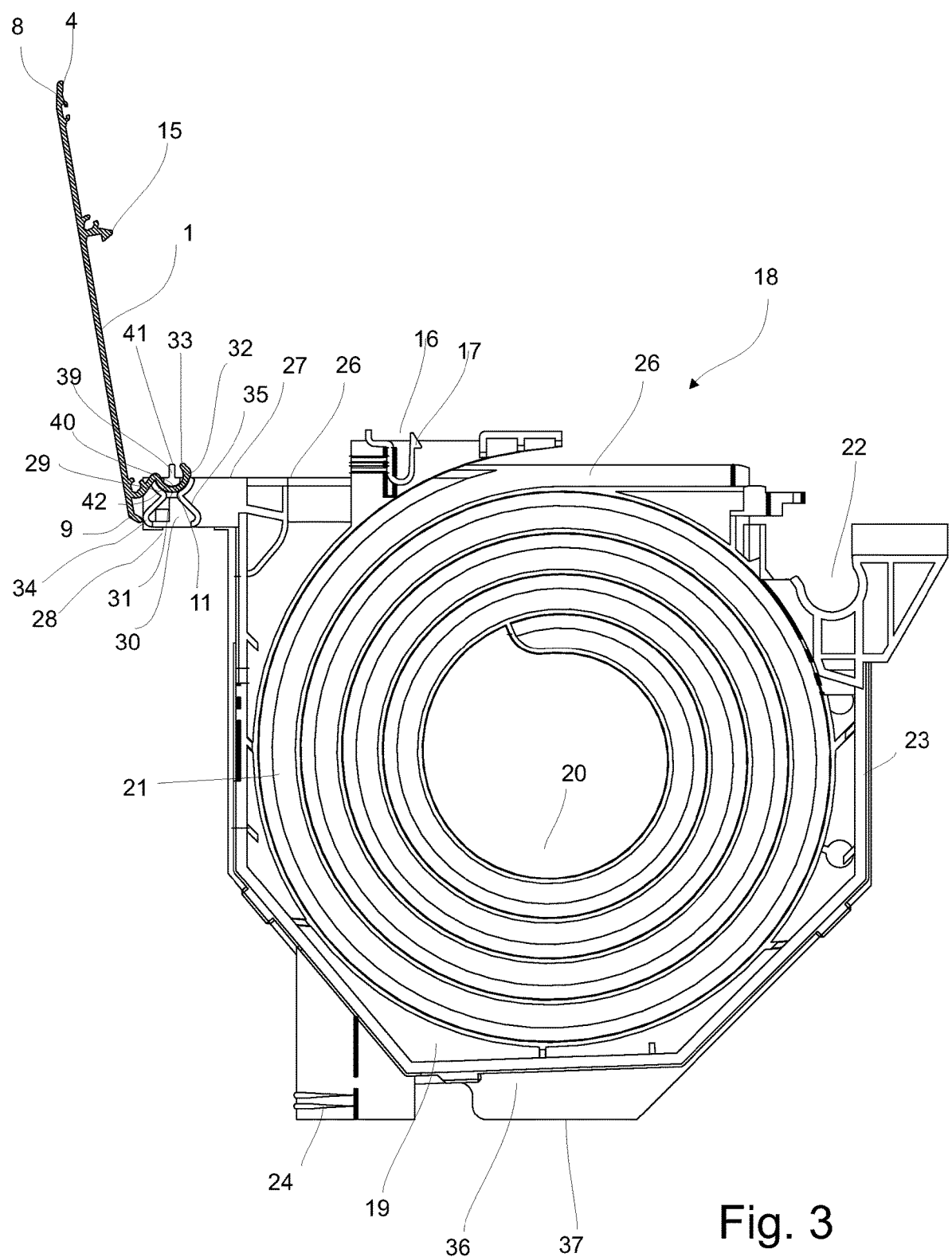
FIG. 3 shows the same seen in an end view as from inside the canister.

Between the front lid edge 3 and the rear lid edge 4 is disposed a first snap locking means 14 with a snapping hook 15 that catches below a second snap locking means 16 including a snapping web 17 on top of the housing end part 18, as seen in FIGS. 2-5. In FIGS. 2 and 3 the lid is open and in FIGS. 4 and 5 the lid is closed.

The housing end part 18 defines a chamber 19 with a housing part end wall 20 provided with a spiral guide track 21 for controlling reception of the truck bed cover (not shown) during roll-up. The spiral guide track 21 is particularly preferred for hard truck bed covers assembled of rigid slats, e.g. the slat described in the applicant's Danish patent application no. PA 2019 70310 and the truck bed cover described in the applicant's international patent application no. PCT/DK2019/050125.

Rolling-up is achieved by an electric motor (not shown) that has its shaft (not shown) rotateably journaled in a bearing bracket 22 at the housing part rear wall 23 of the housing end part 18. A drainage pipe 24 is provided towards the housing part front wall 25 to allow any water to exit the canister. The drainage pipe 24 may be connected to a drain system via a tube.

The housing part upper wall 26 has the second snap locking means 16 protruding upright there from and front projections 27 facing towards the front wall of the truck bed (not shown) substantially perpendicular to a lengthwise extending axis of the lid 1.

The front projections 27 carries the second pivot joint part 28 which points in the direction of the opposite housing end part 6, or said in another way: in parallel with the slats of the truck bed cover: aligned with the central axis of the spiral guide track and coaxial with the first pivot member 12 spaced from the housing part rear wall 23.

The second pivot joint part 28 has a cup section 29 facing towards the hook part 11 to engage said hook part 11. The cup section 29 extends into the spring section 30 below the cup section 29 via a bead gap 31.

A lengthwise extending bead 32 at the vicinity of the free end 33 of the hook part 11 sets in the bead gap 31 for applying tension to the spring section 30.

The spring section 30 is composed of a first protruding retainer wall 34 and a parallel mirror-shaped second protruding retainer wall 35 spaced apart from the first protruding retainer wall 34. The retainer walls 34,35 have zig-zag shapes to resiliently absorb tension. The term "zig-zag" should not be construed as limiting the shape of the retainer walls 34,35 in that any shape or material that provides the resiliency of the retainer walls 34,35 can be used. The "zig-zag" shape can e.g. have pointed of curved apices.

A housing part bottom wall 36 serves as a foot 37 that rests on the bottom of the truck bed or is chocked up on the truck bed bottom.

The second pivot joint part 28 comprises the retainer member 38 composed of the spring section 30 and the cup section 29 and a holding-down member 39.

The holding-down member 39 has a head part 40 and an upright stem 41, and the head part 40 fits pivotingly along the interior curvature of the hook part 11. A pivot space 42 for receiving the hook part 11 is delimited between the cup section 29 of the retainer member 38 and the holding-down member 39.

Figure 4:
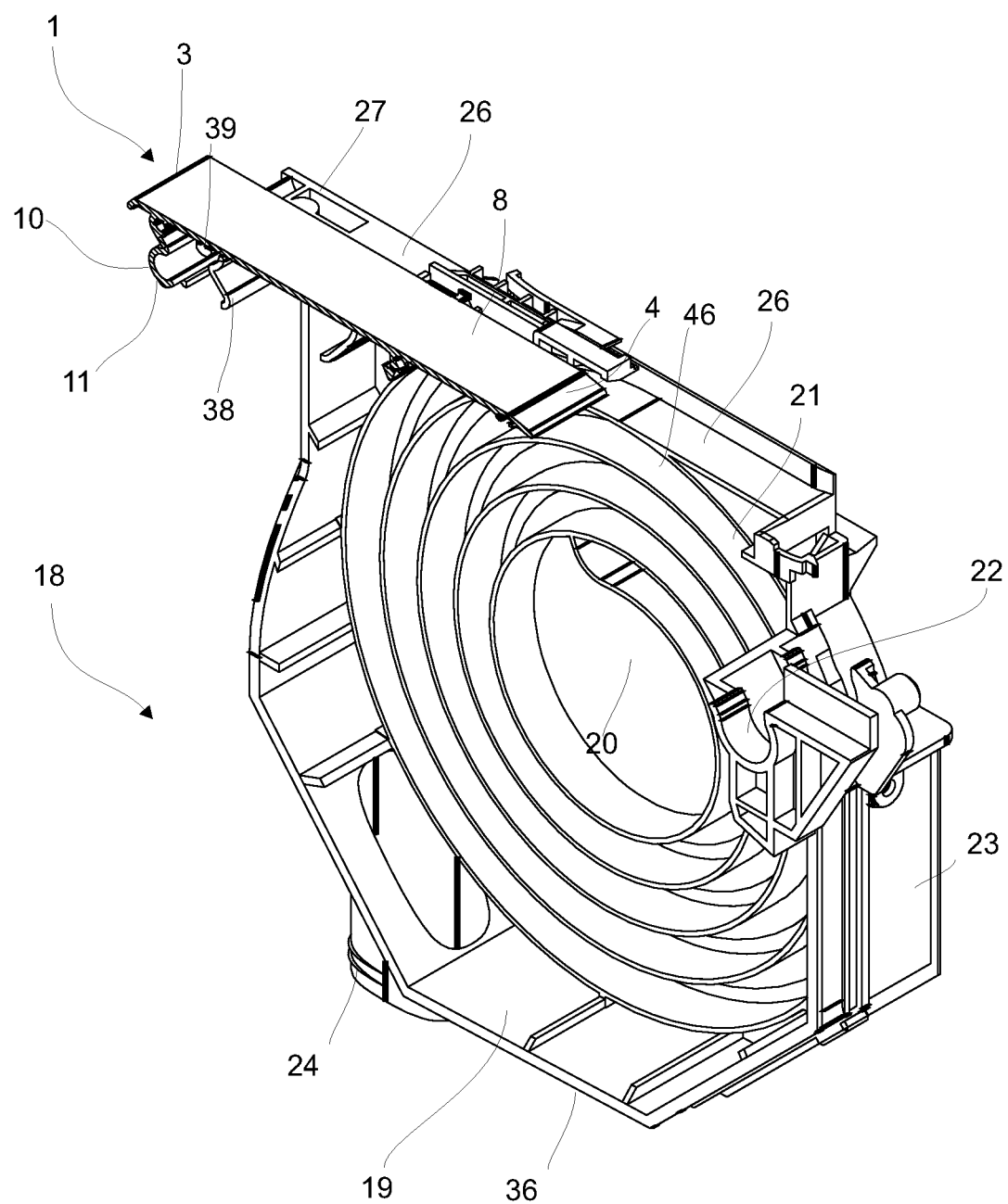
FIG. 4 is a perspective view of a housing end part assembled to a fragment of the first embodiment of a lid in closed position.
Figure 5:
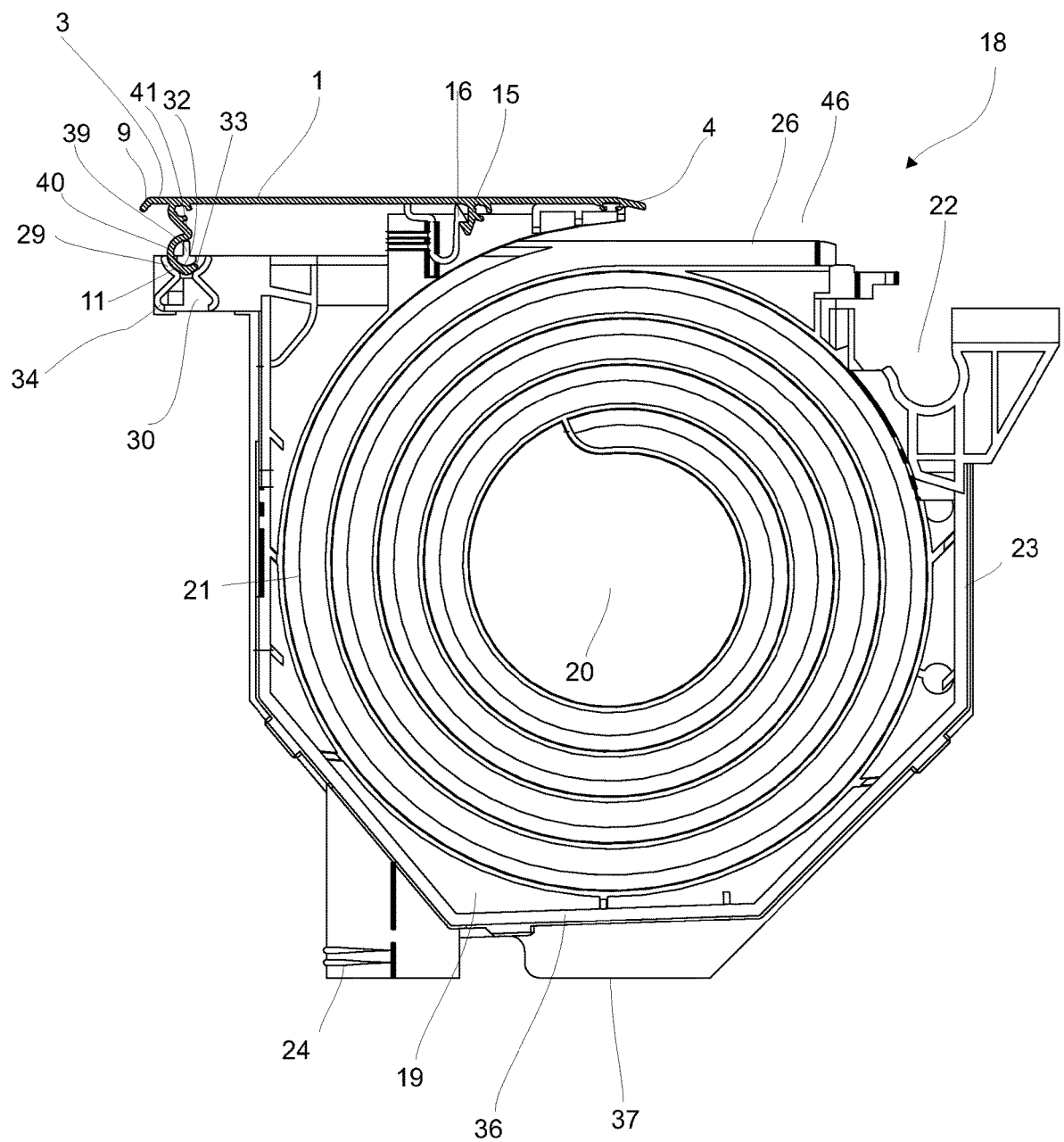
FIG. 5 shows the same seen in end view from inside the canister.

In the closed position of the lid 1, as seen in e.g. FIGS. 4 and 5, the rear lid edge 4 does not extend the whole distance to the housing part rear wall 23 to cover the whole width of the canister 44. A space 46 is left for entry of the truck bed cover. The front slat (not shown) or front profile (not shown) of the array of assembled slats (not shown) of the truck bed cover (not shown) enters the most exterior winding of the spiral track guide 21 below the rear lid edge 4 to cover the canister opening 43 of the canister 44 so that the rear bending 7b is just above the truck bed cover.

Figure 6:
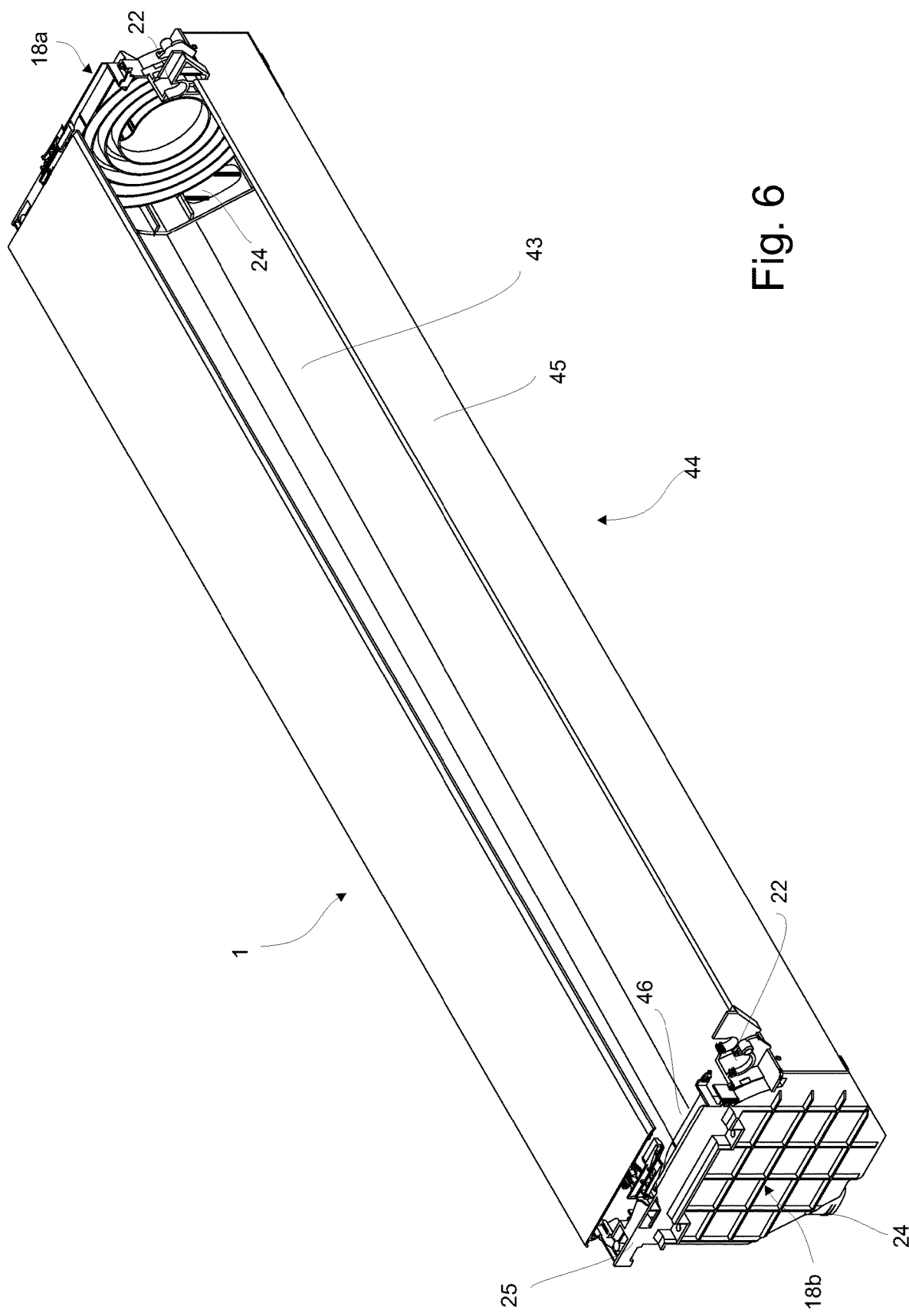
FIG. 6 is a perspective view seen from above of a canister provided with the lid arrangement of the present invention, wherein the lid is the first embodiment of a lid in closed position.
Figure 7:
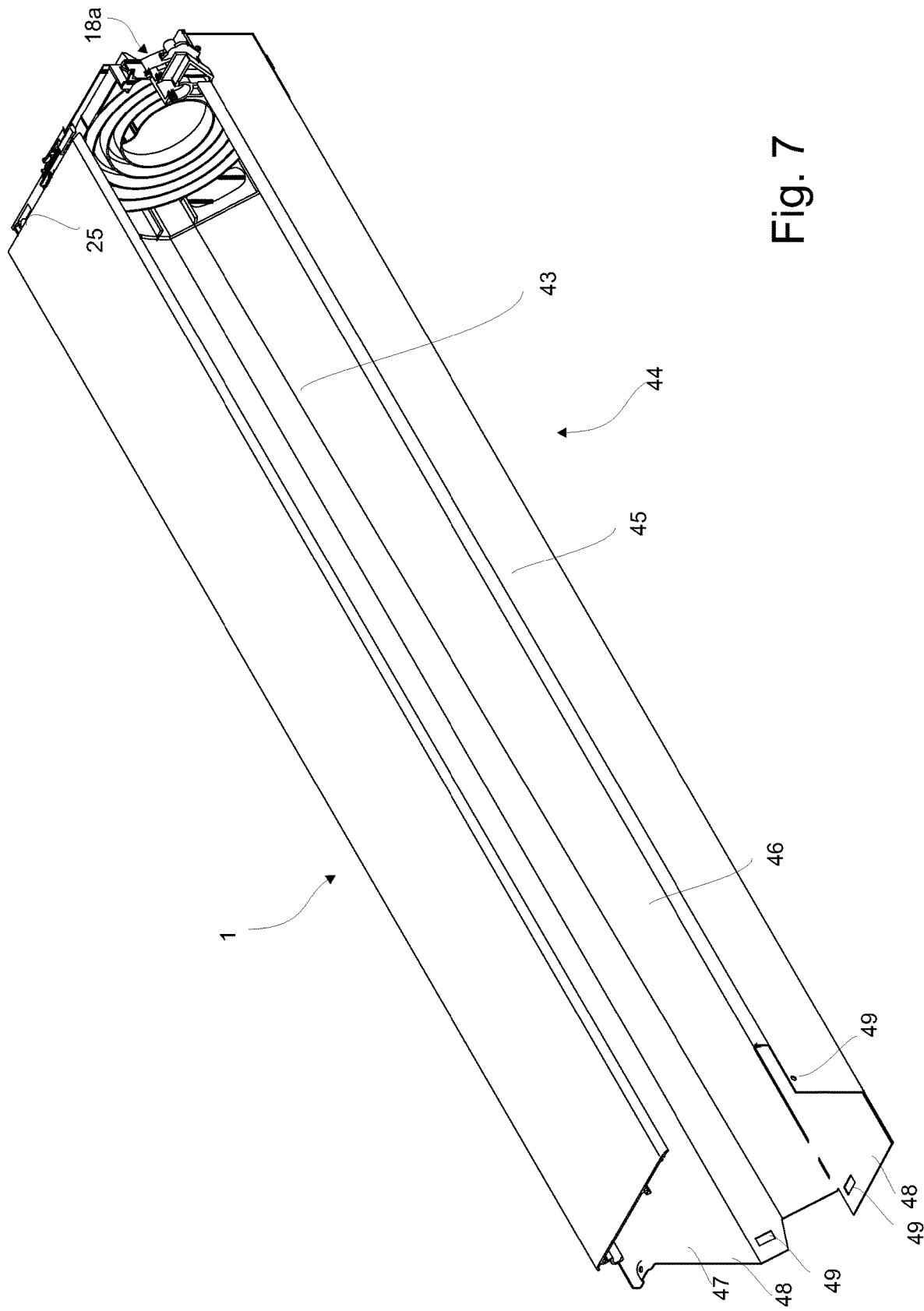
FIG. 7 shows the same with the first embodiment of a lid, wherein the housing part at one main housing part end is removed.
Figure 8:
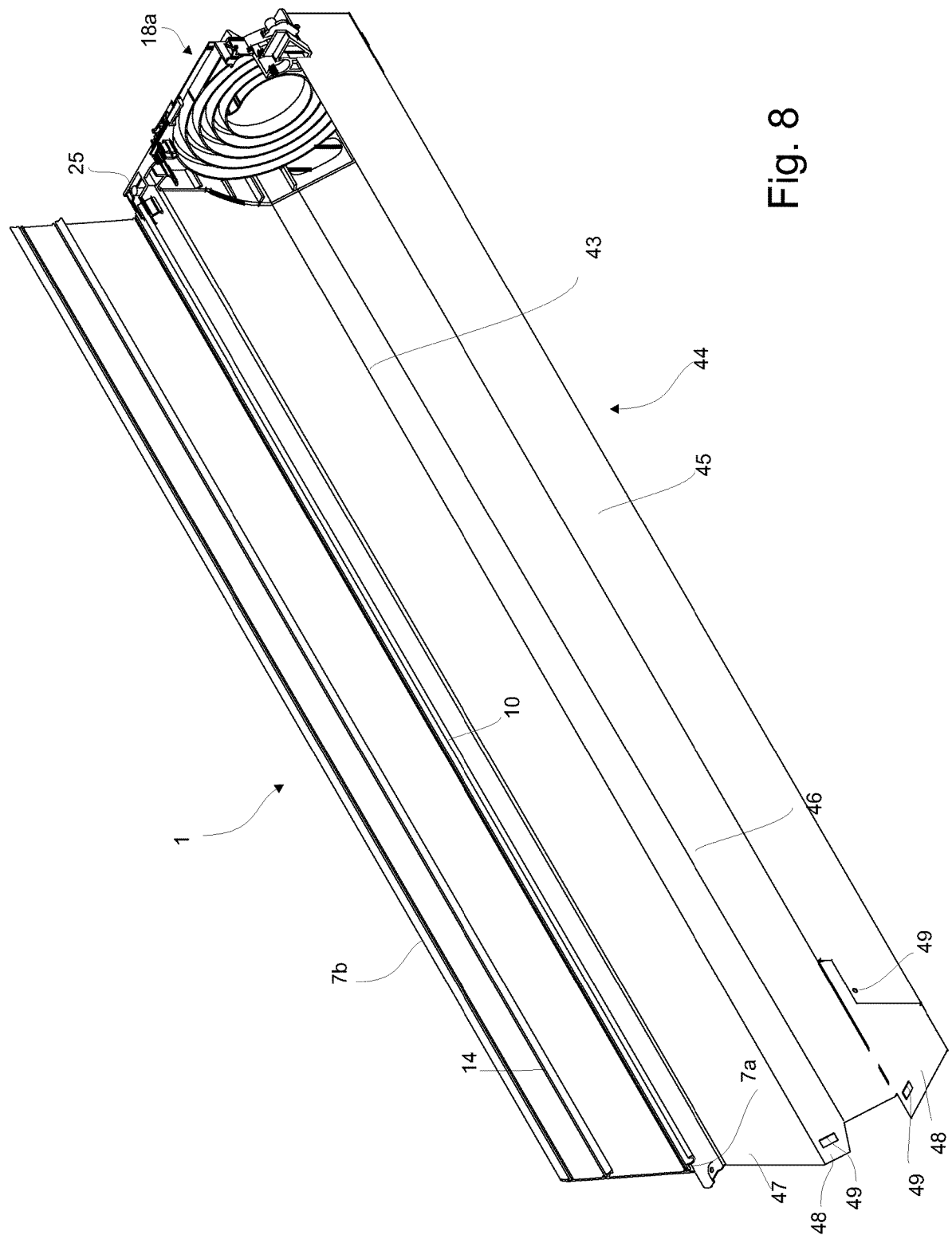
FIG. 8 shows the same with a housing end part at one housing part end and one housing end part removed, and the lid opened.

FIGS. 6-8 show the canister 44 with the lid arrangement of the present invention with the lid 1 in closed and open positions.

FIG. 6 shows that the canister 44 is composed of the main housing part 45, assembled to right housing end part 18a and opposite left housing end part 18b. The lid 1 is closed in FIG. 6. The housing end parts 18a,18b can be assembled to the main housing part 45 by any appropriate means, including connecting means on any of said parts 45,18a,18b, and fasteners (not shown) be used to secure such connecting means to each other to obtain the canister receptacle for the roll-up truck bed cover (not shown).

As seen best in FIGS. 7 and 8 the main housing part 45 has first connecting means 47 in form of first securing webs 48 that protruded axially beyond side edges 5,6 of the lid 1 to secure the respective housing end parts 18a,18b. First fastening holes 49 are provided in the first securing webs 48 to fasten the opposite housing end parts 18a,18b to any of the housing part rear wall 23, the housing part front wall 25, and housing part bottom wall 36, optionally to appropriate second connecting means on said walls 23,25,36.

The lid 1 is pivotably mounted along the housing part front wall 25 between the closed position seen in FIG. 7 and the open position seen in FIG. 8. As seen best in the view of FIG. 8 the first pivot joint part 1, the bendings 7a,7b and the first snap locking means 14 extends the full length of the present embodiment of a lid 1, but these means can in the alternative just be provided at the side edges 5,6, of the lid 1.

Figure 9:
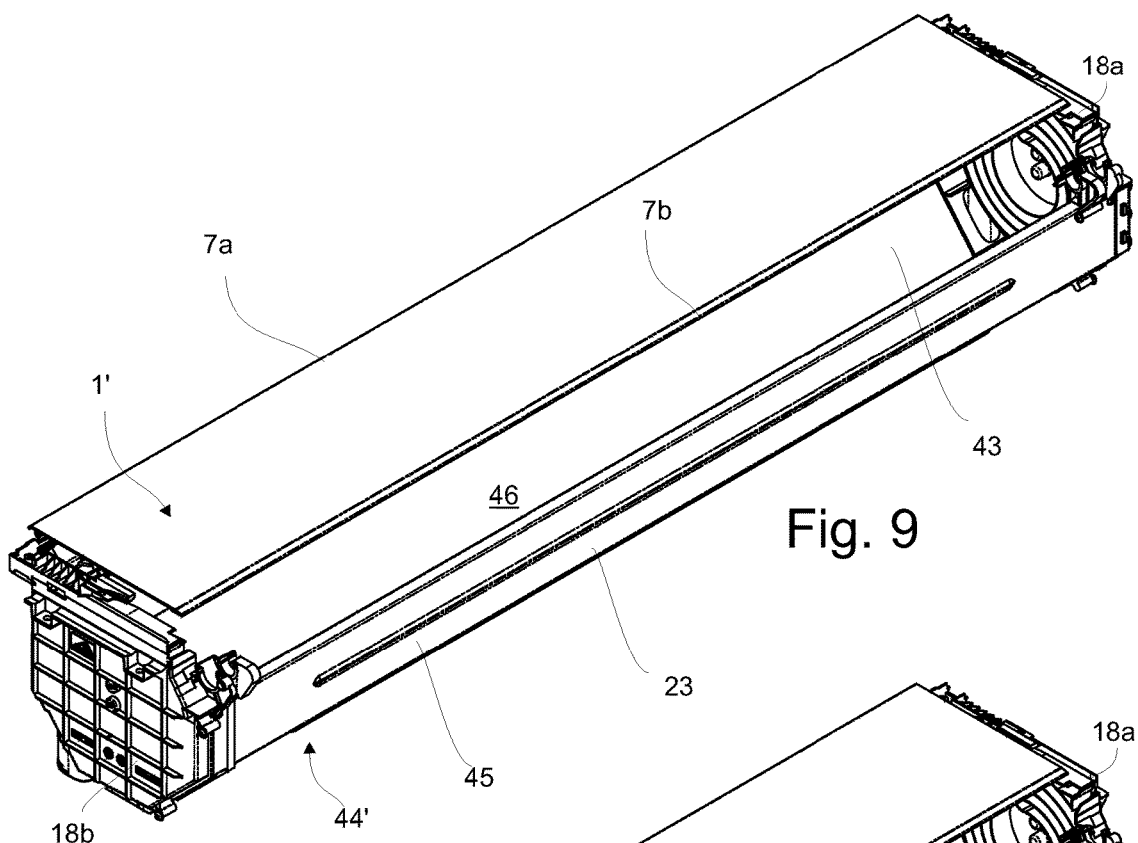
FIG. 9 shows, in a view similar to FIG. 6, a canister provided with the lid arrangement of the present invention, wherein the lid is a second embodiment of a lid in closed position.
Figure 10:
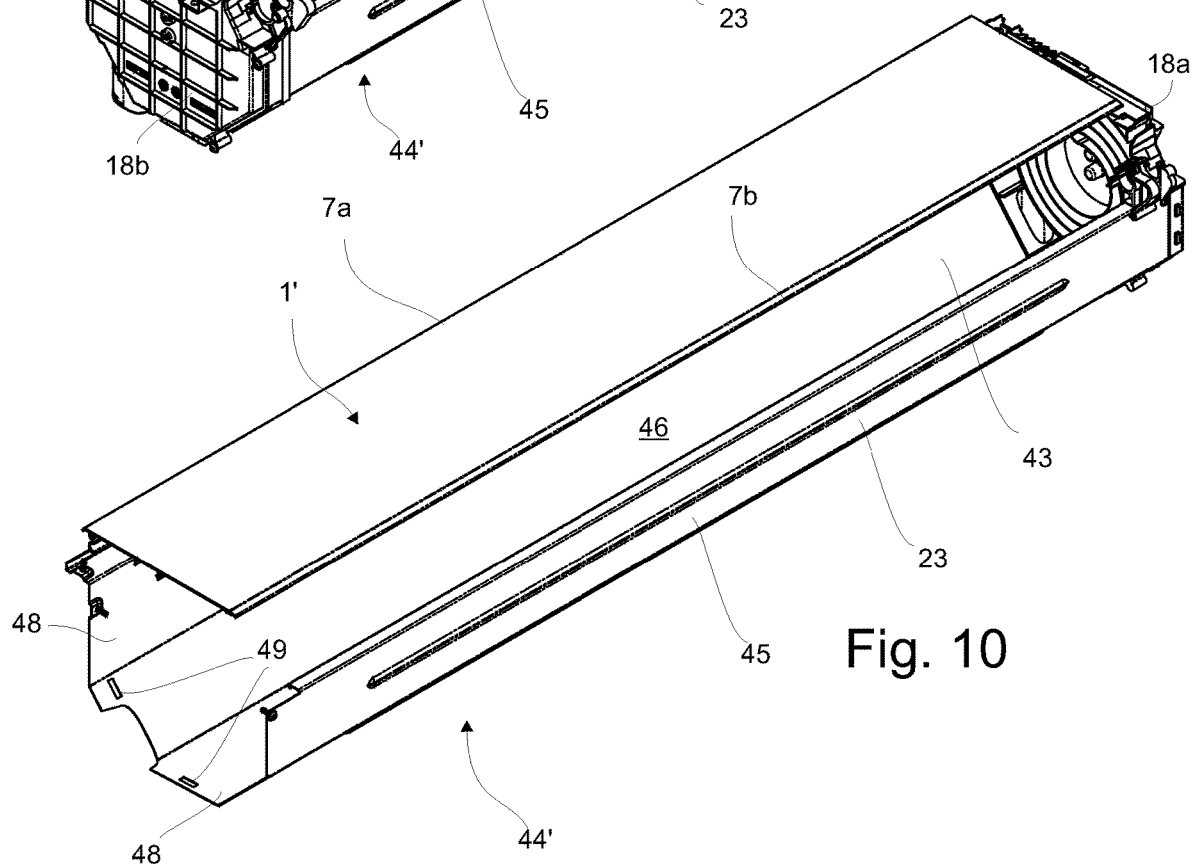
FIG. 10 shows the same, in a view similar to FIG. 7, but wherein the housing part at one main housing part end is removed.

FIGS. 9 and 10 show an alternative lid arrangement that substantially corresponds to the lid arrangement shown and described in relation to FIGS. 1-8. For like parts same reference numerals are used. The lid arrangement shown in FIGS. 9 and 10 differs from the lid arrangement shown in FIGS. 1-6 mainly in the implementation of a second embodiment of a lid 1'. The only difference between the first embodiment of a lid 1 and the second embodiment of a lid 1' is that second embodiment of the lid 1' is wider than the lid 1, so that the rear lid edge 4 extends closer to the housing part rear wall 23, whereby the space 46 left for entry of the truck bed cover is smaller than for the lid arrangement implementing the first embodiment of a lid 1. This smaller space contributes in reducing entry of water when the lid 1' is closed. Preferably the additional width corresponds to a width of a rigid slat of the roll-up truck bed cover.

The lid arrangement that implements a second embodiment of a lid 1' is seen on a second embodiment of a canister 44" having a reinforcing rib 50 on the housing part rear wall 23. Similar reinforcing ribs may be provided on any canister wall or on the lid 1' to provide further structural integrity to the lid 1' and the canister 44', respectively, when said lid 1' and said canister 44' is subjected to the forces from the roll-up truck bed cover when said cover is rolled in an out of the canister 44'.

The invention claimed is:

1. A lid arrangement for a canister for a retractable rollup truck bed cover comprises a lid and a canister, wherein the canister has a main housing part and opposite housing end parts, and wherein the lid spans between said housing end parts across the main housing part, wherein the lid is pivotally connected to at least one of the housing end parts, wherein, in the closed position of the lid, said lid does not cover the whole width of the canister in that a rear lid edge of the lid does not extend the whole distance to a housing part rear wall of the housing end part.

2. A lid arrangement according to claim 1, wherein the underside of the lid cover part has a first pivot joint part and the housing end part has a second pivot joint part, which second pivot joint part extends lengthwise in parallel with the first pivot joint part on an overlapping part of the lid, which second pivot joint part is provided on the housing end part protruding on a projection towards the front of the truck bed.

3. A lid arrangement according to claim 2, wherein the second pivot joint part comprises a retainer member and a holding-down member, and a spring section is delimited between the retainer member and the holding-down member.

4. A lid arrangement according to claim 3, wherein the retainer member has an upper lengthwise extending cup section facing the holding-down member and a lower lengthwise extending resilient spring section facing opposite the holding-down member in extension of the cup section, which spring section comprises a first protruding retainer wall and a parallel mirror-shaped second protruding retainer wall spaced apart from the first protruding retainer wall.

5. A lid arrangement according to claim 4, wherein the first pivot joint part has a first pivot member that is suspended to an underside of a cover part of the lid by means of a second pivot member, the first pivot member is inserted into a pivot space between the retainer member and the holding-down member, and the first pivot member is seated in the cup section of the retainer member to pivot about a head part of the holding-down member, which holding-down member is disposed inside the first pivot member.

6. A lid arrangement according to claim 5, wherein the head part of the holding-down member has an upright stem that faces away from the retainer member.

7. A lid arrangement according to claim 4, wherein the first pivot member has a lengthwise extending bead that fits in a bead gap between the first protruding retainer wall and the parallel mirror-shaped second protruding retainer wall when the lid is closed.

8. A lid arrangement according to claim 1, wherein the lid has first snap locking means disposed between a rear edge of the lid and a front edge of the lid, and the housing end part has second snap locking means arranged to interlock with the first snap coupling means.

9. A lid arrangement according to claim 1, wherein the housing end part has at least one drainage pipe.

10. A truck bed cover comprising the lid arrangement according to claim 1.

* * * * *